United States Patent Office 3,620,017
Patented Nov. 16, 1971

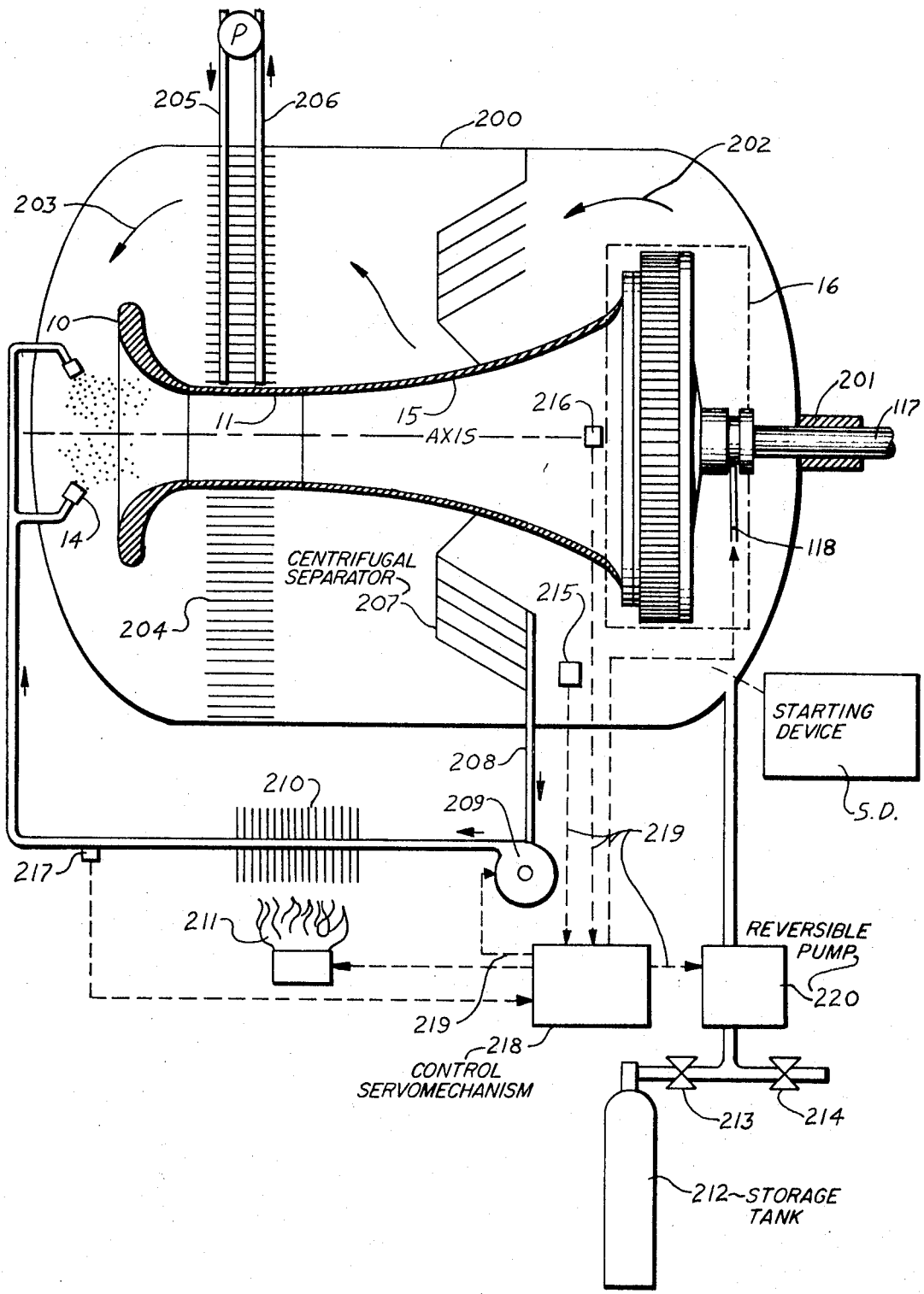

3,620,017
POWER DENSITY CONTROL FOR FLUID-DYNAMIC ENGINES
Giusto Fonda-Bonardi, Los Angeles, Calif., assignor to Robert S. Estes, Emmett Steele, Jay Kurtz, James Linahan, and Carl Clement, Los Angeles, Edward S. Merrill, Palm Springs, and Royal M. Galvin, Pacific Palisades, Calif., fractional part interest to each
Filed June 24, 1969, Ser. No. 836,046
Int. Cl. F01k 3/18; F02k 1/00
U.S. Cl. 60—59                                8 Claims

ABSTRACT OF THE DISCLOSURE

This invention relates to the method and apparatus for controlling the power density of a fluid dynamic engine wherein gas is accelerated through the engine at the speed of sound at the sonic speed of the gas and imparting energy to the gas while maintaining it at the sonic speed. The engine may comprise a duct having a sonic duct section interposed between convergent and divergent sections so that the fluid is successively accelerated to the sonic speed through the convergent section and moves through the sonic section at the sonic speed. The engine may be enclosed in order that the entire thermodynamic cycle may take place inside a pressure tight envelope.

---

This invention is an improvement over the invention disclosed in my co-pending application Ser. No. 798,367 and entitled "Fluid-Dynamic Engine." The device therein disclosed is characterized by the process of heating a gas which is moving at the speed of sound in a duct of suitable shape, and by the utilization of the resulting increase of kinetic energy of the gas. The shape of the duct is related to the rate of heat delivery to the gas, so as to maintain the velocity of the gas equal to the local speed of sound over substantially the entire length of the duct wherein the heat delivery process takes place. Conversely, this means that once a duct is built with a certain profile of cross-sections matched to a given profile of heat delivery rate, the heat delivery rate cannot be changed much from the design profile without causing the flow to deviate from the desired condition of sonic velocity. As a consequence, an engine of this kind can be designed to operate very efficiently for a fixed value of rate of heat absorption and power output, but does not lend itself easily to changes of power output.

There are two kinds of variation of power output that are of great practical interest. One is the adjustment of operating conditions to an optimum set of values resulting in the most efficient operation for relatively long periods of time: an example of this is the adjustment of operating conditions of an airplane engine for most efficient cruise at a given altitude with a given gross airplane weight. The other is the quick variation of power setting required for maneuvers, e.g., take-offs and landings. Here responsiveness is more important than optimum utilization of thermal energy in the engine. Similarly, a ship requires responsive variations of propeller power for docking maneuvers independently from the need for efficient propulsion during cruise. These two distinct requirements can be separately met by two different contrivances, which can, however, be both simultaneously applied to the same engine. Accordingly, this invention refers to means of varying the power output of a fluid-dynamic engine of the type described in co-pending application Ser No. 798,-367, now Pat. No. 3,564,850, in a manner conducive to optimum utilization of the heat energy supplied to the engine from an external source and transformed by the engine into mechanical power of a rotating shaft, when time is available for the adjustment to be carried out and quick response is not needed.

The basic fluid-dynamic engine disclosed and claimed in the aforementioned co-pending application operates by heating a gas while it is moving at the speed of sound in a duct of suitable shape. The total amount of heat absorbed by the gas between two predetermined temperatures is proportional, all other things being equal, to the mass of the gas. When the gas is moving in the duct, the rate of heat absorption (calories per second or B.t.u. per second) is similarly proportional, all other things being equal, to the rate of mass flow in the duct (kilograms per second or pounds per second). Also, the kinetic energy of the gas is proportional to the mass, and the rate of change of kinetic energy (due to heat absorbed at sonic speed) is similarly proportional to the rate of mass flow. It appears therefore that the rate of heat absorption and the rate of mechanical power output (derived from the utilization of the increased kinetic energy) can be both simultaneously and equally changed by changing the rate of mass flow in the sonic duct in which heat is delivered to the operating fluid.

The mass flow $\dot{m}$ of a fluid of density $\rho$ moving with velocity $u$ in a duct of cross-sectional area $A$ is always equal to $$\dot{m} = \rho A u$$

Of these parameters, the cross-section of the duct $A$ cannot be changed without adding an unwarranted and unworkable amount of mechanical complication, and the velocity of the gas $u$ is constrained to remain equal to the speed of sound which is predetermined by the operating temperature. Hence, the only remaining variable available for altering the rate of mass flow $\dot{m}$ is the fluid density $\rho$, which at any predetermined temperature $T$ is proportional to the pressure $p$ for a perfect gas, or generally a function of the pressure $p$ for a real gas or a vapor:

$$\rho = p/RT \text{ or } \rho = \rho(p)$$

Since the temperature profile along the sonic duct is predetermined by the characteristics of the heat-delivery agent, so that $T$ is not readily available for manipulation, the mass flow $\dot{m}$ can be best adjusted to any desired value within the design range by changing the pressure $p$. Also, since the pressure $p^*$ in the sonic section is generally proportional to the pressure $p$ in any other place of a duct or fixed geometry, the pressure in the sonic section can be changed by changing all pressures in the system in the same ratio without affecting the flow properties.

The present invention, then, is directed to the method and apparatus for controlling the power density of a fluid dynamic engine of the aforementioned type by controlling the pressure of the fluid in the sonic duct of the engine and thereby the rate of mass flow therethrough.

Further advantages of the invention can be realized through the reference to the single drawing forming part of this specification.

Now referring to the drawing, the preferred arrangement for changing the operating pressure of a fluid-dynamic engine is shown in the drawing and is of the type disclosed in my co-pending application bearing Ser. No. 798,367, now Pat. No. 3,564,850. The teachings of this application are incorporated herein by reference and a more detailed description of the fluid dynamic engine may be had through reference to said application. In this application the power output is generally indicated as some utilization means 16. The power output of the engine for the purposes of the present description is assumed to be delivered by rotating shaft 117 in accordance with the teachings of my co-pending application bearing Ser. No. 817,490. For a more detailed explanation of the power output control, reference may be had to the latter-mentioned co-pending application.

The entire engine is enclosed in a pressure-tight envelope 200 equipped with a packing gland, rotary seal, labyrinth, or other pressure-tight element 201 for sealing the penetration point of shaft 117 if this is used to carry the rotation and the associated mechanical power outside of envelope 200 as shown. Alternately, power may be extracted from the envelope without pressure loss therefrom by means of an electric generator (not shown) connected to shaft 117 and wholly contained within the envelope, the electric power thus generated being carried outside through pressure-tight insulating bushings, or by any other suitable means.

Envelope 200 is assumed generally symmetrical about the axis of the fluid-dynamic engine (although symmetry is not a necessary requirement) and arrows 202 and 203 indicate the general direction of the circulation of the fluid within the envelope. The fluid, once set in motion by a starting device, generally indicated in block form and identified by the reference characters S.D., is never stopped as long as the engine is running, and undergoes the entire thermodynamic cycle inside the envelope 200. The velocity of the fluid, equal to the speed of sound in sonic section 11, is instead very much slower in the return path from the utilization means 16 back to the convergent duct 10 because of the very much larger cross-sectional area available to the fluid between the exterior of duct 10—11—15 and the inner wall of envelope 200, and also because some kinetic energy is removed by utilization means 16. The amount of kinetic energy removed is made up, of course, by the increase of kinetic energy resulting as a consequence of heating in sonic duct 11.

The patent application bearing Serial No. 798,367, now Pat. No. 3,564,850, briefly discusses the distinction between thermodynamic cycles closed by means of a state transformation occurring outside the engine, i.e. in the atmosphere, and thermodynamic cycles closed within the engine, quote:

"In other cases the working fluid is completely contained within the engine and the cycle is closed by means of some . . . transformation, e.g. an isothermal transformation in the condenser of a steam engine."

The device here described belongs to this second class of engines, and the closing transformation occurs at constant pressure (except for frictional losses of pressure which are, however, small because of the low velocity of the fluid in the return path). In the normal case of the working fluid being a gas and not steam, no condensation is involved; still, heat must be transferred in order to change the state of the fluid from the temperature at the exhaust of utilization means 16 to the proper temperature for the inlet 10 to sonic duct 11. The change of temperature (at substantially constant pressure) occurs as the fluid traverses one or more heat exchangers 204 served with an external heat transfer medium by means of tubes 205 and 206. Heat exchangers 204 perform a function analogous to that of a condenser in a steam engine, permitting the fluid to operate under steady-state and continuous conditions between predetermined temperature limits. Heat exchangers 204 are wholly contained within envelope 200 and only tubes 205 and 206, carrying the heat transfer medium, are brought out to the external environment. The heat transfer medium is circulated in heat exchangers 204 by means of a pump P. The heat transfer medium may be sea water in the case of ship engines, or another liquid or gas (including atmospheric air) if heat is to be exchanged with the atmosphere in land-based or airborne applications. If an intermediate fluid is used, another heat exchanger (not shown) performs the final heat exchange with the external environment.

The preferred method for delivering heat to the fluid while it is moving with the speed of sound in sonic duct 11 is a method mentioned in my co-pending application No. 798,367 and consisting of a fine fog of liquid droplets sprayed in the intake of the duct at a temperature higher than the gas temperature. The droplets, entrained by the gas stream, are carried through the duct. The heat capacity of the liquid acts as a heat source until the liquid has cooled, and the gas heated, to an equal temperature at which point heat transfer ceases. The size of the droplets is chosen so as to insure essentially complete heat transfer by the time the droplets are carried to the end of the sonic duct 11. The droplets, if fine enough, do not otherwise affect the gas-dynamic processes in the duct, and pass unaffected through the utilization means 16.

The liquid is collected in a centrifugal separator 207, also wholly contained in envelope 200, and is then removed from the envelope by means of tube 208. The liquid is propelled by a pump 209, reheated in an external heat exchanger 210 by an external heat source symbolized by a flame 211, and re-injected in the gas stream by means of one or more spray nozzles 14. It should be noted that although a flame 211 is used to symbolize the external source of primary heat, any other conceivable source of thermal energy falls within the scope of this disclosure, such as a nuclear reactor, solar heat, chemical reactions other than combustion, etc.

To summarize, the engine operates by means of two closed fluid loops: the gas loop carries the gas (or vapor) through the following steps: charging the gas with fine hot liquid droplets, expanding and accelerating the gas carrying the liquid droplets to sonic speed, heating it by means of the heat carried by the droplets while it is moving at the speed of sound, decelerating it and recompressing it, utilizing the increment of kinetic energy obtained in the process, separating the liquid from the gas, transferring heat in an internal heat exchanger to restore the initial state of the gas. The liquid loop carries the liquid through the following steps: heating the liquid in an external heat exchanger, spraying the liquid in fine droplets in the gas stream, transferring heat to the gas while it is moving at the speed of sound, recovering the liquid from the gas, and pumping it through the external heat exchanger to the starting point.

Any suitable gas or vapor can be used in the gas loop, and any suitable liquid can be used in the liquid loop, depending on the temperature range in which the engine is designed to operate. For example, in an application involving a nuclear reactor as a primary heat source, the fluid in the gas loop may be an inert gas such as helium or argon, and the fluid in the liquid loop may be a metal such as sodium, lithium, or an alloy (NaK). Any combination of compatible working fluids falls, accordingly, within the scope of this invention.

It should be noted that this arrangement places the primary heat source externally to envelope 200, and that the process of heat transfer to the gas in sonic duct 11 depends on the size of the liquid droplets (actually on the statistical distribution of sizes) for the profile of heat delivery rate along the duct, since the time required for a droplet to cool is a function of its diameter as well as the heat conductivity of the liquid, and depends on the number of droplets (or the total mass of liquid) for the total amount of heat transferred. Consequently, if the shape of the duct is matched for sonic operation to a particular statistical distribution of sizes of liquid droplets, it will remain matched if the number of droplets will be caused to change in proportion of the mass flow rate of gas as long as the size distribution is not changed. This affords the possibility of changing the power output of the engine by changing the pressure (and therefore the density) of the gas in envelope 200, and simultaneously changing in the same ratio the mass of liquid injected as well as the rate of primary heat delivery to heat exchanger 210.

The density of the gas in envelope 200 is changed by means of a reversible pump 220. The time required for a predetermined change in the envelope pressure depends on the ratio between the volume of envelope 200 and the thruput capacity of pump 220, so that sudden changes of power output cannot be accomplished by these means unless the pump is impractically large. If the operating gas is air, the air is taken from the atmosphere through valve 214 and pumped into envelope 200 to that value of pressure which causes the air density and therefore the power output to reach the desired value. If the operating fluid is a fluid other than air, it is taken by pump 220 from storage tanks 212 through valve 213. When it is desired to reduce the power output, the pressure in the envelope is reduced by reversing pump 220 and by returning the excess operating fluid either to the atmosphere or to storage tanks 212. Each change of pressure is accompanied by a proportional change of heat delivery by the external source 211 as well as by a proportional change of liquid mass flow through spray nozzles 14. This can be done by changing the delivery of pump 209 and/or changing the number of active nozzles 14 by means of valves (not shown). Each output power setting then results from the selection of a predetermined combination of values for the gas pressure in envelope 200, heat delivery by external source 211, and liquid mass flow through nozzles 14, all coordinated to maintain sonic speed for the gas moving in duct 11. This combination of conditions results in the optimal transformation of the heat delivered by source 211 into mechanical power delivered through the rotation of shaft 117.

The coordination of the settings of the operating parameters may be done either separately and/or manually, or preferably automatically by means of a control servomechanism 218 linking sensors 215, 216 and 217 in envelope 200, which measure suitable parameters such as respectively the pressure in the envelope $p$, the stagnation pressure in the subsonic diffuser $P_0$ and the liquid temperature; and controlling other parameters, such as the liquid flow rate through nozzles 14 and the heat output of primary heat source 211. Also linked in the control loop, symbolized by dotted lines 219, may be the control of pump 220 and the control 118 of the axial position of the turbine wheel disclosed in co-pending application No. 817,490. In this manner a single command input to the control servomechanism can cause the system to acquire a predetermined configuration computed to provide the desired power output at shaft 117 and simultaneously in the shortest practical time the best set of operating conditions for the remainder of the system.

What is claimed is:

1. A method of operating a fluid-dynamic engine including the steps of
   accelerating a fluid through an engine at the speed of sound at the sonic speed of the fluid,
   imparting energy to the fluid while maintaining it at said sonic speed,
   deriving power from the fluid after it has had the energy imparted to it, and
   controlling the pressure of the fluid while at said sonic speed for optimizing the power output of the engine.
2. A method of operating a fluid dynamic engine as defined in claim 1 wherein the energy is imparted to the fluid from an external source in the form of heat.
3. A method of operating a fluid-dynamic engine as defined in claim 1 wherein controlling the pressure of the fluid includes controlling the rate of mass flow of the fluid at said sonic speed.
4. A method of operating a fluid-dynamic engine including the steps of
   charging a gas or vapor steam with liquid droplets at a preselected temperature,
   expanding and accelerating the liquid laden gas stream to sonic speed to cause the gas to be heated by the liquid droplets,
   decelerating and recompressing the heated gas,
   deriving torque from the energy of the gas,
   separating the liquid from the gas,
   restoring the initial pressure and temperature of the gas by means of heat exchange with the external environment,
   reheating the liquid to the preselected temperature, and
   recharging the reheated liquid into the gas stream for continuously operating the engine.
5. A fluid-dynamic engine comprising a pressure tight envelope,
   a fluid conveying duct having a sonic section interposed between a convergent section and a divergent section so that a fluid introduced therein is successively accelerated to said sonic speed, moved at said sonic speed through the sonic duct and maintained at said sonic speed arranged in the envelope,
   power transmitting means coupled to one end of said duct and extending outside of said envelope,
   heat exchange means arranged to extend into said envelope and outside of said fluid conveying duct for exchanging heat with a fluid circulating within the envelope,
   said envelope further including a first operating fluid circulating within said envelope and through said duct,
   means for introducing a heated second operating fluid into said envelope to be entrained with the first operating fluid adjacent the convergent section of the fluid conveying duct, and
   means for collecting one of said operating fluids and conveying it to said latter-mentioned means.
6. A fluid dynamic engine as defined in claim 5 including means for controlling the rate of heat delivery to the first operating fluid in response to the power demand on said means for transmitting power.
7. A fluid-dynamic engine comprising a pressure tight envelope,
   a fluid conveying duct having a sonic section interposed between a convergent section and a divergent section so that a fluid introduced therein is successively accelerated to said sonic speed, moved at said sonic speed through the sonic duct and maintained at said sonic speed arranged in the envelope,
   power transmitting means coupled to one end of said duct and extending outside of said envelope,
   heat exchange means arranged to extend into said envelope and outside of said fluid conveying duct for exchanging heat with a fluid circulating within the envelope,
   said envelope further including an operating gas circulating within said envelope and through said duct,
   external means for conveying and introducing a heated liquid into said envelope to be entrained with the operating gas adjacent the convergent section of the fluid conveying duct,
   the liquid laden gas being accelerated to sonic speed in being conveyed through said duct and transferring the heat of the liquid to the gas while moving at the sonic speed,
   means for collecting the liquid from the gas and conveying it to said latter-mentioned means, and means for controlling the rate of heat delivery to the operating gas in response to the power demand on said means for transmitting power.

8. A fluid dynamic engine as defined in claim 7 including means for sensing the pressure in said envelope, means for sensing the stagnation pressure in the subsonic diffusion section in the duct, means for sensing the temperature of the liquid, each of said means providing a control indication of the sensed parameter and coupling same to said control means.

References Cited
UNITED STATES PATENTS

| | | | |
|---|---|---|---|
| 2,920,448 | 1/1960 | Coanda | 60—39.49 |
| 3,040,516 | 6/1962 | Brees | 66—270 X |
| 3,355,891 | 12/1967 | Rhodes | 60—270 |
| 3,382,679 | 5/1968 | Spoerlein | 60—39.49 X |

MARK M. NEWMAN, Primary Examiner

R. B. ROTHMAN, Assistant Examiner